United States Patent [19]

Shibazaki et al.

[11] 4,219,590

[45] Aug. 26, 1980

[54] METHOD FOR IMPROVING CALCIUM CARBONATE

[75] Inventors: Hiroji Shibazaki, Takarazuka; Setsuji Edagawa; Yoshinaga Okamoto, both of Nishinomiya, all of Japan

[73] Assignee: Shiraishi Kogyo Kaisha, Ltd., Hyogo, Japan

[21] Appl. No.: 26,193

[22] Filed: Apr. 2, 1979

Related U.S. Application Data

[63] Continuation of Ser. No. 832,608, Sep. 12, 1977, abandoned.

[30] Foreign Application Priority Data

Jan. 20, 1977 [JP]  Japan ................................ 52-5663

[51] Int. Cl.$^2$ ............................................ B05D 7/00
[52] U.S. Cl. ................................. 427/215; 423/267; 423/274; 423/268; 260/42.14; 106/306; 106/308 B; 106/308 F; 427/220; 427/213
[58] Field of Search .................... 423/267, 268, 274; 427/215, 220, 213; 106/306, 308 F, 308 B; 260/42.14

[56] References Cited

FOREIGN PATENT DOCUMENTS 49-34500  3/1974  Japan ...................................... 423/432
48-45128  12/1974  Japan ...................................... 423/432

*Primary Examiner*—Sam Silverberg

[57] ABSTRACT

A method for improving calcium carbonate by causing calcium carbonate particles to undergo contact reaction with an acid gas capable of reacting with calcium carbonate for finely uniformizing the calcium carbonate particle size and, at the same time, coating the surface of the calcium carbonate particles with the calcium salt of the acid of the acid gas.

5 Claims, 3 Drawing Figures

X 5,000

X 5,000

X 5,000

METHOD FOR IMPROVING CALCIUM CARBONATE

This is a continuation of application Ser. No. 832,608 filed Sept. 12, 1977, now abandoned.

BACKGROUND OF THE INVENTION

At present in rubber, plastics, paper, paint and other industries, calcium carbonate particles having an average particle diameter of not more than 20 μm are effectively used in huge quantities for various purposes. With a view to precluding aggregation of particles and enhancing the affinity of the particles with a substance to which the particles are being added as a filler, these calcium carbonate particles have their surface treated with the acid or sodium salt of fatty acid, resin acid or other similar acid.

This surface treatment is carried out by a method which comprises mixing by agitation an aqueous suspension of calcium carbonate with a surface-treating agent prepared in the form of a solution or emulsion for adsorbing said surface-treating agent on the surface of calcium carbonate particles, subsequently, dehydrating the resultant mixture, drying and pulverizing the mixture and classifying the resultant particles or by a method which comprises directly spraying calcium carbonate powder with a surface-treating agent.

The former method entails many operations such as dehydrating, drying, pulverizing and classifying and the latter method, although simple in terms of operation, is difficult for the surface-treating agent to be uniformly adsorbed on the surface of calcium carbonate particles. To make the matter worse, neither of the two methods is effective in uniformizing the calcium carbonate particle size in the course of surface treatment.

SUMMARY OF THE INVENTION

The present invention relates to a method for the improvement of calcium carbonate, which comprises causing calcium carbonate particles having an average particle diameter of not more than 20 μm to undergo contact reaction with an acid gas capable of reacting with calcium carbonate for thereby finely uniformizing the calcium carbonate particle size and, at the same time, coating the surface of the calcium carbonate particles with the calcium salt of the acid of said acid gas.

DETAILED DESCRIPTION OF THE INVENTION

Figure 1:
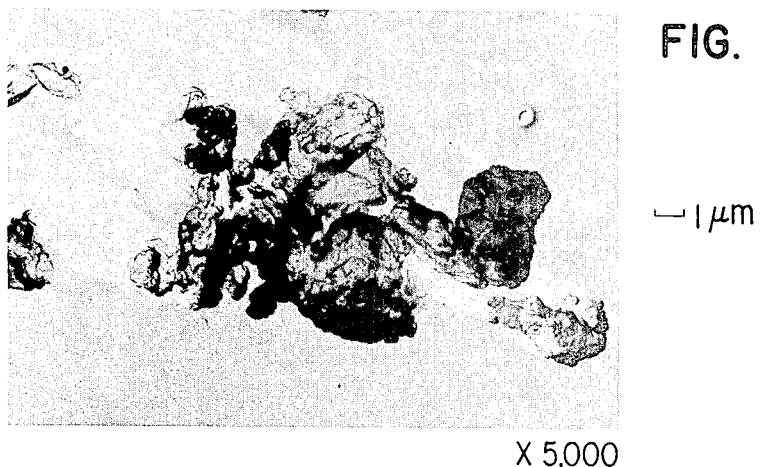
FIG. 1 is an electron microphotograph (× 5,000) taken, for the purpose of comparison, of calcium carbonate particles 4 μm in average particle diameter in a state prior to treatment.
Figure 2:
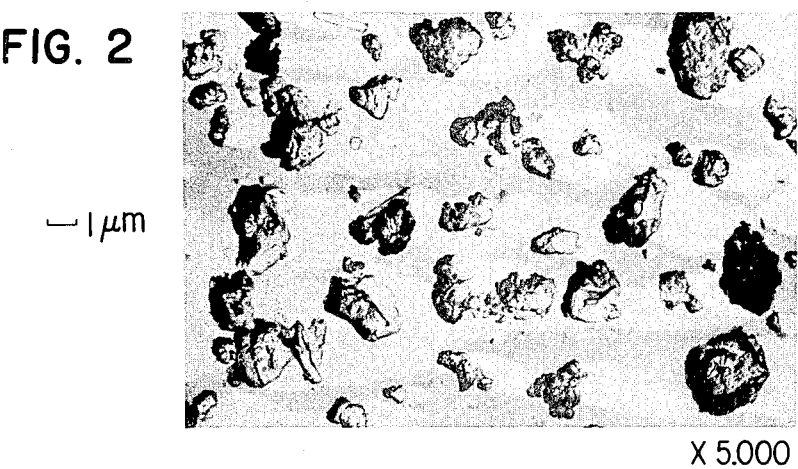
FIG. 2 is an electron microphotograph (× 5,000) taken of calcium carbonate particles at the end of 10 minutes of the treatment of Example 1.
Figure 3:
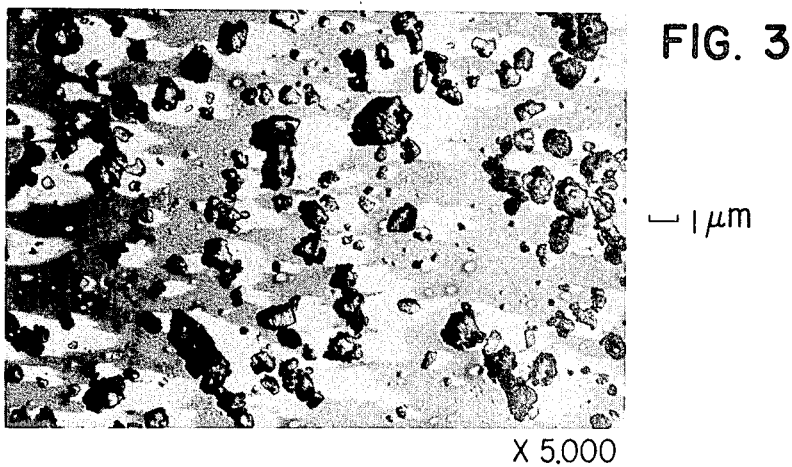
FIG. 3 is an electron microphotograph (× 5,000) taken of the same calcium carbonate particles at the end of 30 minutes of the treatment of Example 1.

The calcium carbonate as the matrix of the improved calcium carbonate aimed at by the present invention is heavy calcium carbonate of the type obtained by pulverizing and classifying crystalline compact limestone or clacium carbonate of the type obtained by drying and pulverizing light, colloidal precipitated calcium carbonate. Calcium carbonate particles of such an origin can be used on the sole condition that their average particle diameter is not more than 20 μm, i.e. the upper limit below which the particles serve advantageously as a filler in various products such as plastics, paints, paper and rubber.

For the surface treatment of the present invention, there can be used any acid gas, organic or inorganic, insofar as it assumes acidity upon dissolution in water and is capable of reacting with calcium carbonate. Examples of acid gases usable for this purpose include gases obtained by heating inorganic compounds such as phosphoric acid, hydrofluoric acid, sulfurous acid, nitric acid, chlorides and fluorides of aluminum, zinc, silicon and titanium and organic compounds such as formic acid, acetic acid, caproic acid, acrylic acid, fumaric acid, terephthalic acid, caprylic acid and capric acid to beyond boiling points or sublimating points thereof for thereby vaporizing them. These acid gases can be used either singly or in the form of a mixture consisting of two or more members. If the acid gas to be used happens to contain water at a high concentration, the water in the acid gas plays the part of a binder while the acid gas is reacting with calcium carbonate, with the result that the calcium carbonate particles are mutually bound to form blocks. To prevent this undesirable phenomenon, the acid gas must be dehumidified to a water content of less than 0.1% by weight in advance to use in the treatment or it must be deprived of its water content by heating to temperatures of more than 100° C.

The desired improvement of calcium carbonate according to this invention is accomplished by continuously supplying calcium carbonate particles downwardly at a fixed feed volume into a reactor and, at the same time, introducing upwardly into the reactor a dehumidified acid gas at a fixed flow rate through an acidproof filter cloth, whereby the calcium carbonate particles undergo contact reaction with the acid gas because of their counterflow contact.

The calcium carbonate particles which have undergone the treatment are continuously withdrawn out of the reactor through the bottom. The acid gas to be introduced into the reactor is desired to be controlled in concentration in the range of from 10 to 50% by volume and in feed velocity in the range of from 5 to 20 cm/sec. so that the acid gas flows past the calcium carbonate particles while fluidizing the particles and the acid content in the spent gas discharged through the top of the reactor is decreased to zero. The treatment, therefore, requires a device which automatically controls the acid gas concentration and the feed volume of calcium carbonate particles. In place of the continuous fluidized bed method described above, there may be employed a batch fluidized bed method or parallel flow method, which comprises blowing calcium carbonate particles into the current of an acid gas and thereby causing said particles to undergo contact reaction with the acid gas within a gas pipe and, at the end of the contact reaction, collecting the treated particles by a cyclone, an electric dust collector or some other suitable method and putting the used acid gas to recycling or to neutralization and absorption, followed by release into the atmosphere.

Unlike the conventional treatment involving use of a liquid substance, the method of this invention enables the acid gas to penetrate into the calcium carbonate particles even through the tiniest gaps and break them into finer particles. As the supply of the acid gas is continued, the size-reducing phenomenon occurs on the freshly formed surfaces of particles. This phenomenon repeats in the manner of chain reaction. Thus, the uniformization of particle diameter is eventually realized. At the same time, the calcium carbonate and the acid gas react with each other, with the result that the finely divided calcium carbonate particles will have their surface coated with the calcium salt of the acid gas as if in a plated metal.

When hydrogen fluoride is used as the acid gas, the improved calcium carbonate particles consequently obtained enjoys lowered solubility in acids. Thus, they can be expected to find utility in applications requiring resistance to acids. Use of an organic acid gas can be expected to provide enhanced affinity for the vehicle or for the matrix. Thus, varying pigmental properties can be imparted to produced calcium carbonate particles by suitably selecting kinds of acid gases to be used. For example, acidproofness can be provided by using hydrogen fluoride, sulfur dioxide, phosphoric anhydride and chlorides and fluorides of titanium, aluminum, silica, etc. and opacity can be provided by using chlorides and fluorides of titanium, zinc, etc. Needless to mention, the improvement of surface properties also serves the purpose of heightening the dispersibility and improving the strength and other physical properties. The size reduction of the calcium carbonate particles which is accomplished at the same time is such that the specific surface area of calcium carbonate particles measured by the BET method is increased from 3 $m^2/g$ to 10 to 20 $m^2/g$ as the result of the treatment performed by the method of this invention.

Now, the present invention will be described with reference to working examples.

EXAMPLE 1

Heavy calcium carbonate particles having an average particle diameter of 4 $\mu m$ were continuously fed downwardly into a reactor. At the same time, hydrogen fluoride vaporized at 30° C. and diluted with air to a concentration of 30% by volume was blown upwardly into the reactor at a flow velocity of 15 cm/sec. to have said particles and said gas to come into counterflow contact and undergo contact reaction for 10 and 30 minutes. Improved calcium carbonate particles coated with calcium fluoride were removed through the bottom of the reactor. The calcium carbonate particles were tested for an insoluble matter in 1 N acetic acid and for specific surface area by the BET method before the treatment, after 10 minutes of the treatment and after 30 minutes of the treatment. The results were as shown below.

| | Insoluble matter in 1N acetic acid (%) | Specific surface area by BET method ($m^2/g$) |
|---|---|---|
| Calcium carbonate particles after 10 minutes of the treatment by the method of this invention | 3.69 | 5.8 |
| Calcium carbonate particles after 30 minutes of the treatment by the method of this invention | 26.12 | 20.1 |
| Calcium carbonate particles before the treatment | 0.12 | 3.0 |

EXAMPLE 2

Similarly to Example 1, titanium tetrachloride vaporized at 150° C. and diluted with nitrogen gas to a concentration of 50% by volume was introduced at a flow velocity of 15 cm/sec. and brought into counterflow contact with cubic calcium carbonate particles having an average particle diameter of 0.5 $\mu m$. After 30 minutes of the contact reaction, there were obtained improved calcium carbonate particles coated with calcium titanate and having high hiding power.

The produced particles were tested for hiding power in a water system by means of a cryptometer. The results were as shown below.

| | Hiding power ($cm^2/g$) |
|---|---|
| Calcium carbonate particles after 30 minutes of the treatment by the method of this invention | 82.3 |
| Calcium carbonate particles before the treatment | 20.5 |

What is claimed is:

1. A method for the coating of calcium carbonate particles having an average diameter of not more than 20 $\mu m$ with an inoganic acid vapor to form a calcium salt of said acid on the surface of said particle to produce more uniform particles of reduced average particle diameter and increased average particle surface area which comprises reacting said calcium carbonate particles with a vapor of said acid, the water content of the acid vapor being below 0.1% by weight.

2. A method according to claim 1 wherein the acid vapor is at least one member selected from the group consisting of vapors of phosphoric acid, hydrofluoric acid, sulfurous acid, nitric acid, and chlorides and fluorides of aluminum, zinc, silicon and titanium.

3. A method according to claim 1 wherein the acid vapor is the acid vapor of hydrofluoric acid.

4. A method according to claim 1 wherein the acid vapor is the acid vapor of titanium tetrachloride.

5. A method according to claim 1, wherein the concentration of the acid vapor is from 10 to 50% by volume, and the flow velocity is from 5 to 20 cm/sec.

* * * * *